United States Patent
Takasugi et al.

(10) Patent No.: US 10,953,628 B2
(45) Date of Patent: Mar. 23, 2021

(54) LAMINATE HAVING OXYGEN BARRIER PROPERTIES AND PACKAGING MATERIAL COMPRISING LAMINATE

(71) Applicant: Dai Nippon Printing Co., Ltd., Tokyo (JP)

(72) Inventors: Yuya Takasugi, Tokyo (JP); Takuya Yasutomi, Tokyo (JP); Hiroshi Matsuzaki, Tokyo (JP); Katsunobu Ito, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 120 days.

(21) Appl. No.: 16/318,061

(22) PCT Filed: Jul. 27, 2017

(86) PCT No.: PCT/JP2017/027260
§ 371 (c)(1),
(2) Date: Jan. 15, 2019

(87) PCT Pub. No.: WO2018/021478
PCT Pub. Date: Feb. 1, 2018

(65) Prior Publication Data
US 2019/0240956 A1    Aug. 8, 2019

(30) Foreign Application Priority Data

Jul. 29, 2016    (JP) .............................. JP2016-149437

(51) Int. Cl.
*B32B 7/12*    (2006.01)
*B65D 65/40*    (2006.01)
(Continued)

(52) U.S. Cl.
CPC ................. *B32B 7/12* (2013.01); *B32B 9/00* (2013.01); *B32B 27/08* (2013.01); *B65D 65/40* (2013.01); *B32B 2307/7242* (2013.01)

(58) Field of Classification Search
CPC .. B32B 7/12; B32B 9/00; B32B 27/08; B32B 2307/7242; B65D 65/40
See application file for complete search history.

(56) References Cited

U.S. PATENT DOCUMENTS

2013/0302591 A1* 11/2013 Timmerman ............. B32B 3/26
428/319.9
2016/0185504 A1* 6/2016 Ito ......................... B65D 81/263
383/103

FOREIGN PATENT DOCUMENTS

JP    2001-335078    12/2001
JP    3829526 B    10/2006
(Continued)

OTHER PUBLICATIONS

English machine translation for JP2011-230451A, Sep. 17, 2011.*
(Continued)

*Primary Examiner* — Michael C Miggins
(74) *Attorney, Agent, or Firm* — Hamre, Schumann, Mueller & Larson, P.C.

(57) ABSTRACT

The invention provides a laminate having excellent oxygen barrier properties and excellent flex resistance, and a packaging material comprising the laminate. A laminate having at least a substrate layer, an adhesive layer, a barrier layer and a sealant layer, and a packaging material comprising the laminate, wherein the adhesive layer is a layer having oxygen barrier properties.

16 Claims, 2 Drawing Sheets

(51) Int. Cl.
    *B32B 9/00*   (2006.01)
    *B32B 27/08*  (2006.01)

(56) References Cited

FOREIGN PATENT DOCUMENTS

| | | |
|---|---|---|
| JP | 4054972 B   | 3/2008  |
| JP | 2008-265833 | 11/2008 |
| JP | 2009-262424 | 11/2009 |
| JP | 2010-012769 | 1/2010  |
| JP | 2011-230451 | 11/2011 |
| JP | 2013-253133 | 12/2013 |
| JP | 2015-058568 | 3/2015  |
| WO | 2014/141818 | 9/2014  |

OTHER PUBLICATIONS

International Preliminary Report on Patentability issued for PCT/JP2017/027260, dated Feb. 7, 2019, 23 pages with English translation.
The extended European search report issued for European Patent Application No. 17834480.0, dated Jan. 2, 2020, 10 pages.
Office Action issued for the counterpart Japanese Patent Application No. 2016-149437, dated Sep. 29, 2020, 8 pages including machine translation.

* cited by examiner

LAMINATE HAVING OXYGEN BARRIER PROPERTIES AND PACKAGING MATERIAL COMPRISING LAMINATE

TECHNICAL FIELD

The present invention relates to a laminate with oxygen barrier properties having a substrate layer, an adhesive layer, a barrier layer and a sealant layer, and a laminate with oxygen barrier properties having a substrate layer, a vapor deposition layer, a barrier coat layer, an adhesive layer, a barrier layer and a sealant layer, as well as to an oxygen barrier packaging material comprising the laminates, and it further relates to a packaging material with excellent oxygen barrier properties (reduced oxygen permeability), which uses a barrier layer composed of a vapor deposition layer, and an adhesive layer having excellent oxygen barrier properties as the adhesive layer that contacts with the barrier layer.

BACKGROUND ART

Packaging materials with oxygen barrier properties are generally composed of a laminate having at least a substrate layer, a barrier layer, an adhesive layer and a sealant layer, where the barrier layer that is used to improve the oxygen barrier properties is a metal foil or a metal or metal oxide vapor deposition film.

It is known that a metal foil used as a barrier layer is able to provide high oxygen barrier properties, but since the thickness of a metal foil is thicker than a vapor deposition film, the packaging material using the metal foil is thicker and the flex resistance is inferior.

In contrast, using a vapor deposition film of a metal or metal oxide allows the film thickness to be reduced for excellent bending performance, but it has not been possible to achieve sufficient oxygen barrier properties, largely due to irregularities on the vapor deposition film surface.

PTL 1 describes a composite film with a gas (oxygen) barrier property (having a substrate film layer and a layer that includes a thermosetting polyurethane resin with a gas barrier property), using a thermosetting polyurethane resin with a barrier property for gas (oxygen) that includes, as the oxygen barrier material, a cured resin obtained by reacting an active hydrogen-containing compound (A) and an organic polyisocyanate compound (B), wherein the cured resin contains a meta-xylene diisocyanate skeletal structure at 20% by mass or greater, and the proportion of trifunctional or greater compounds in (A) and (B) is 7 mass % or greater with respect to the total amount of (A) and (B).

Also, PTL 2 describes a barrier laminate obtained by using a dry lamination technique for bonding of the thin-film layer side of a transparent coating film having a thin-film layer composed of silicon oxide or aluminum oxide disposed on at least one side of a polymer film substrate, and a heat-sealing resin film, with a barrier adhesive containing one or more types of particles selected from among inorganic silicon oxide or aluminum oxide materials, and a polyester polyol and an isocyanate compound, as well as a packaging material using the same.

In PTL 1, however, the composition requires the use of a highly polar solvent, and therefore its manageability is poor. For example, when a highly dissolving solvent such as acetone is used, the boiling point is low and moisture in external air is easily taken up, resulting in a problematic tendency toward increased viscosity due to reaction between water and the isocyanate.

Moreover, since PTL 2 (Japanese Patent No. 3829526) uses a spherical or amorphous inorganic compound having inorganic compound particle diameters on the nano order, which is included in an adhesive, the oxygen barrier properties of the adhesive itself, and particularly the oxygen barrier properties when under a flexural load, are not very high.

CITATION LIST

Patent Literature

[PTL 1] Japanese Patent Specification No. 4054972
[PTL 2] Japanese Patent Specification No. 3829526

SUMMARY OF INVENTION

Technical Problem

It is an object of the present invention to solve these problems by providing a laminate having excellent oxygen barrier properties and excellent flex resistance, and a packaging material comprising the laminate.

Solution to Problem

As a result of much research, the present inventors have found that the aforementioned object can be achieved by a laminate having at least a substrate layer, an adhesive layer, a barrier layer and a sealant layer, and a packaging material comprising the laminate, or a laminate having a substrate layer, a vapor deposition layer, a barrier coat layer, an adhesive layer, a barrier layer and a sealant layer, and a packaging material comprising the laminate, wherein the barrier layer is composed of a vapor deposition layer and the adhesive layer has oxygen barrier properties.

The present invention has the following features.

1. A laminate having at least a substrate layer, an adhesive layer, a barrier layer and a sealant layer, wherein the adhesive layer has oxygen barrier properties.

2. The laminate according to 1. above, having a vapor deposition layer and a barrier coat layer between the substrate layer and the adhesive layer.

3. The laminate according to 2. above, having a printing layer between the barrier coat layer and the adhesive layer.

4. A packaging material comprising a laminate having at least a substrate layer, an adhesive layer, a barrier layer and a sealant layer, wherein the adhesive layer has oxygen barrier properties.

5. The packaging material according to 4. above, comprising a laminate having a vapor deposition layer and a barrier coat layer between the substrate layer and the adhesive layer.

6. The packaging material according to 5. above, comprising a laminate having a printing layer between the barrier coat layer and the adhesive layer.

7. The packaging material according to 5. or 6. above, wherein the vapor deposition layer is composed of an aluminum vapor deposition film, an alumina vapor deposition film or a silica vapor deposition film.

8. The packaging material according to 4. to 7. above, wherein the barrier layer is an aluminum vapor deposition film.

9. The packaging material according to 4. to 8. above, wherein the thickness of the barrier layer is 1 to 100 nm.

10. The packaging material according to 4. to 9. above, wherein the coating amount of the adhesive of the adhesive layer is 2.0 μm to 4.0 μm.

11. The packaging material according to 4. to 10. above, wherein the oxygen permeability of the laminate in an environment of 23° C., 90% RH is 0.05 to 1.00 cc/m²·day·atm.

12. The packaging material according to 4. to 11. above, wherein after the laminate has been subjected to a flexural load 3 times with a Gelbo Flex Tester, the increase in the oxygen permeability of the laminate in an environment of 23° C., 90% RH compared to before being subjected to the flexural load is 0.7 to 4.0 cc/m²·day·atm.

Advantageous Effects of Invention

The laminate and the packaging material comprising the laminate of the invention comprise a laminate having at least a substrate layer, an adhesive layer, a barrier layer and a sealant layer, or a laminate having at least a substrate layer, a vapor deposition layer, a barrier coat layer, an adhesive layer, a barrier layer and a sealant layer, wherein combination of the barrier layer which is a vapor deposition film and the adhesive layer which has oxygen barrier properties, causes the recesses of the irregularities produced on the vapor deposition layer surface to become filled by the adhesive which has oxygen barrier properties, thereby rendering the barrier properties uniform in the in-plane direction and reducing the layer thickness of the barrier layer to maintain flexibility, while exhibiting high oxygen barrier properties that have not been possible with the prior art.

DESCRIPTION OF EMBODIMENTS

The laminate with oxygen barrier properties and the packaging material comprising the laminate according to the invention will now be described in detail with reference to the accompanying drawings.

Figure 1:
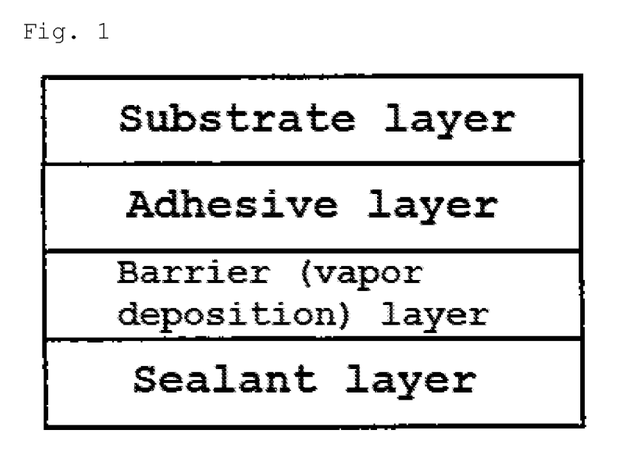
FIG. 1 is a schematic cross-sectional diagram showing an example of the laminar structure of a packaging material of the invention.
Figure 2:
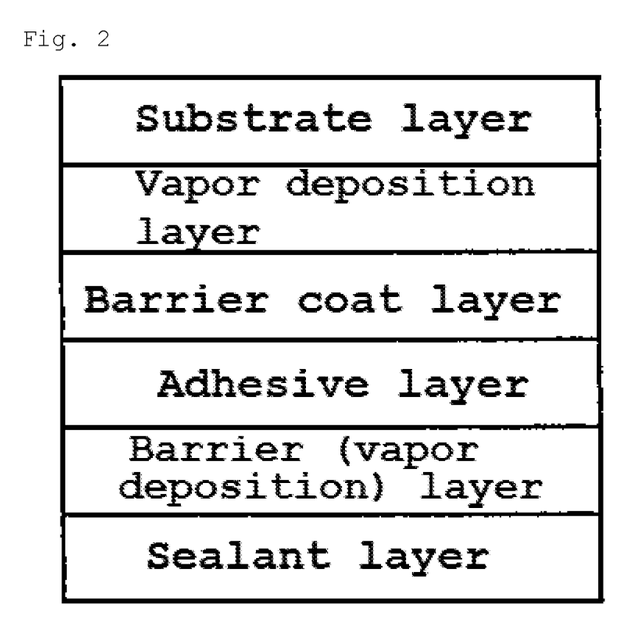
FIG. 2 is a schematic cross-sectional diagram showing another example of the laminar structure of a packaging material of the invention.
Figure 3:
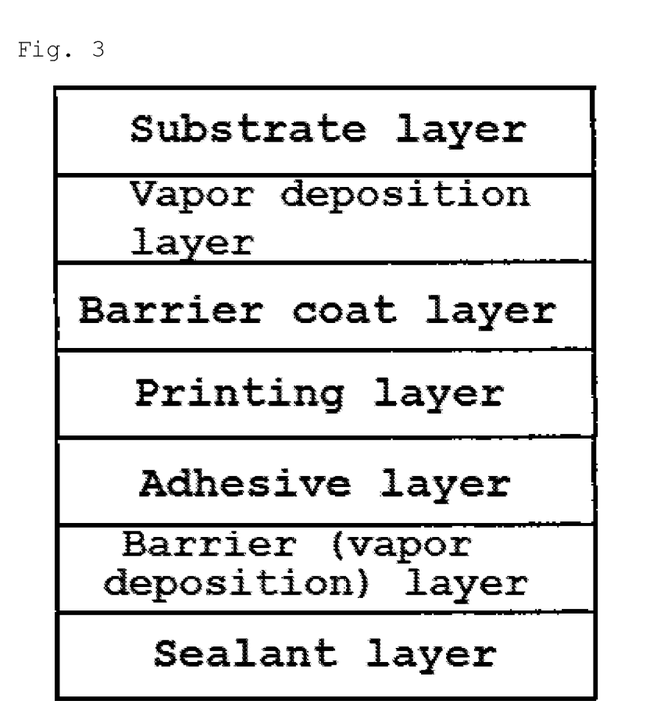
FIG. 3 is a schematic cross-sectional diagram showing yet another example of the laminar structure of a packaging material of the invention.

FIGS. 1 to 3 are schematic cross-sectional diagrams showing examples of laminar structures of laminated bodies forming packaging materials of the invention.

As shown in FIG. 1, the laminate of the invention has a basic structure with a construction in which a substrate layer, an adhesive layer, a barrier layer and a sealant layer are laminated.

As shown in FIG. 2, in another mode of the laminate of the invention, the construction may be one in which a vapor deposition layer and a barrier coat layer are laminated between the substrate layer and adhesive layer.

As shown in FIG. 3, in yet another mode of the laminate of the invention, the construction may be one in which a printing layer is laminated between the barrier coat layer and adhesive layer.

These examples are merely examples of the packaging material of the invention and are not intended to restrict the invention.

The materials of the laminate used in the packaging material with oxygen barrier properties according to the invention, and their production methods, will now be described.

The names of the resins used for the invention are those commonly used in the industry.

[Substrate Layer]

The substrate layer composing the laminate of the invention may be an inorganic material such as a metal or metal oxide or an organic material such as a resin, in the form of a film or sheet, for example, having excellent chemical and physical strength, able to withstand the conditions of inorganic oxide vapor deposition film formation, and able to satisfactorily maintain the properties of the inorganic oxide vapor deposition film without impairment.

While a single-layer film or multilayer laminate film may be used as the substrate layer in the laminate of the invention, this is not limitative, and any desired film employed in packaging materials may be used. Any of these may be freely selected for use, as suited for the conditions of use including the type of contents to be packaged and potential heat treatment after filling.

Specific examples of films preferably used as substrate layers include paper, aluminum foil, cellophane, polyamide-based resin films, polyester-based resin films, olefin-based resin films, acid-modified polyolefin-based resin films, polystyrene-based resin films, polyurethane-based resin films, acetal-based resin films, such films that have been uniaxially or biaxially stretched, K-coated films, resin films such as low-density polyethylene, medium-density polyethylene, high-density polyethylene, linear low-density polyethylene, polypropylene, polybutene, polyvinyl alcohol, ethylene-vinyl acetate copolymer, ionomer, ethylene-(meth)acrylic acid copolymer, ethylene-(meth)acrylic acid ester copolymer, ethylene-propylene copolymer, methylpentene, polyacrylonitrile, acrylonitrile-styrene copolymer, acrylonitrile-butadiene-styrene copolymer, polycarbonate, polyvinyl chloride (PVC), polyvinylidene chloride (PVDC), polyvinylidene fluoride (PVDF), ethylene-tetrafluoroethylene copolymer (ETFE), polytetrafluoroethylene (PTFE), polyethylene terephthalate (PET), polybutylene terephthalate or polyethylene naphthalate films, for example, K-coated stretched polypropylene films, K-coated stretched nylon films, and composite films comprising laminates of two or more of these films.

Preferred for use among these are uniaxially or biaxially stretched polyester films such as polyethylene terephthalate or polyethylene naphthalate, uniaxially or biaxially stretched polyamide films of polyamides such as nylon 6, nylon 66 or MXD6 (poly meta-xylyleneadipamide), or OPP biaxially stretched polypropylene films.

(Film Thickness of Substrate Layer)

The thickness of the substrate layer may be arbitrarily selected, but from the viewpoint of moldability and transparency, it may be selected in the range of about 1 μm to 300 μm, and preferably in the range of 1 to 100 μm. If the thickness is too small the strength will be insufficient, and if it is too large the rigidity will be too high, and processing may become difficult.

(Surface Treatment)

In order to increase adhesiveness with the adhesive layer (or inorganic oxide vapor deposition layer) in the substrate layer (substrate film or sheet), the adhesive layer side surface of the substrate layer (substrate film or sheet) before lamination (or inorganic oxide vapor deposition) may, if necessary, be subjected to physical treatment such as corona discharge treatment, ozone treatment, cold plasma treatment using oxygen gas or nitrogen gas, or glow discharge treatment, to chemical treatment such as oxidizing treatment using a chemical agent or the like, or to treatment for formation of an adhesive layer, primer coating agent layer, undercoat layer or vapor deposition anchor coating agent layer, and it may also be pretreated, or provided with an inorganic oxide vapor deposition layer after surface treatment of the substrate film, and even further provided with a gas barrier coating film (barrier coat layer) on the inorganic oxide vapor deposition layer.

(Film Forming Method)

The film or sheet of the resin that is to be the substrate layer may employ one or more of these resins, for example, and it may be produced by a film-forming method used in the prior art such as an extrusion method, cast molding method, T-die method, cutting method or inflation method, or two or more different resins may be used for multilayer co-extrusion as the film-forming method.

From the viewpoint of film strength, dimensional stability and heat resistance, a tenter system or tubular system, for example, may be used for stretching in uniaxial or biaxial directions.

(Additives)

The resin film to serve as the substrate layer may, if necessary, have various plastic formulating agents or additives such as lubricants, crosslinking agents, antioxidants, ultraviolet absorbers, light stabilizers, fillers, reinforcing agents, antistatic agents or pigments, added for the purpose of, for example, improving or modifying the workability, heat resistance, weather resistance, mechanical properties, dimensional stability, oxidation resistance, slidability, releasability, flame retardance, mold resistance, electrical properties or strength of the film, in which case the amounts of addition may be as desired according to the purpose, in ranges that do not affect the gas barrier properties.

[Adhesive Layer]

The adhesive layer of the invention must be an adhesive layer having oxygen barrier properties.

Examples of resin compositions for adhesives that form adhesive layers with oxygen barrier properties include resin compositions for adhesives that are resins comprising (A) a resin having two or more hydroxyl groups in the molecule as functional groups, (B) an isocyanate compound having two or more isocyanate groups in the molecule as functional groups, and (C) a specific phosphoric acid-modified compound, wherein the main backbone contains a polyester, polyester-polyurethane, polyether or polyether-polyurethane, and that also contain lamellar inorganic compounds.

(Resin Having Two or More Hydroxyl Groups in the Molecule as Functional Groups (A))

The polybasic carboxylic acid component of the resin having two or more hydroxyl groups in the molecule as functional groups (A), wherein the main backbone contains a polyester, may be polybasic acids such as succinic acid, adipic acid, azelaic acid, sebacic acid, dodecanedicarboxylic acid or 1,4-cyclohexanedicarboxylic acid, as aliphatic polybasic carboxylic acids, orthophthalic acid, terephthalic acid, isophthalic acid, pyromellitic acid, trimellitic acid, 1,4-naphthalenedicarboxylic acid, 2,5-naphthalenedicarboxylic acid, 2,6-naphthalenedicarboxylic acid, naphthalic acid, biphenyldicarboxylic acid or 1,2-bis(phenoxy)ethane-p,p'-dicarboxylic acid, or their dicarboxylic acid anhydrides or ester-forming derivatives, as aromatic polybasic carboxylic acids; or p-hydroxybenzoic acid, p-(2-hydroxyethoxy)benzoic acid and their dihydroxycarboxylic acid ester-forming derivatives, either alone or in mixtures of two or more.

Specific examples of polyhydric alcohol components include ethylene glycol, propylene glycol, butylene glycol, neopentyl glycol, cyclohexanedimethanol, 1,5-pentanediol, 3-methyl-1,5-pentanediol, 1,6-hexanediol, methylpentanediol, dimethylbutanediol, butylethylpropanediol, diethylene glycol, triethylene glycol, tetraethylene glycol, dipropylene glycol and tripropylene glycol, as aliphatic diols, and hydroquinone, resorcinol, catechol, naphthalenediol, biphenol, bisphenol A, bisphenol F and tetramethylbiphenol, as aromatic polyhydric phenols, as well as their ethylene oxide extension products and hydrogenated alicyclic forms.

Polycondensation reaction between the polybasic carboxylic acid and polyhydric alcohol may be carried out by a commonly known method.

(Isocyanate Compound Having Two or More Isocyanate Groups in the Molecule as Functional Groups (B))

The isocyanate compound having two or more isocyanate groups in the molecule as functional groups (B) may be a publicly known compound that can react with the hydroxyl groups of the resin (A), such as a diisocyanate compound, polyisocyanate compound or epoxy compound. From the viewpoint of adhesion and retort resistance, it is preferred to use a polyisocyanate compound.

The polyisocyanate compounds include aromatic and aliphatic diisocyanates and trivalent or greater polyisocyanate compounds, and they may be either low molecular compounds or high molecular compounds.

Examples include tetramethylene diisocyanate, hexamethylene diisocyanate, toluene diisocyanate, diphenylmethane diisocyanate, diphenylmethane hydride diisocyanate, xylylene diisocyanate, xylylene hydride diisocyanate or isophorone diisocyanate, or trimers of these isocyanate compounds, and adducts obtained by reacting excesses of these isocyanate compounds with, for example, low molecular active hydrogen compounds such as ethylene glycol, propylene glycol, meta-xylylene alcohol, 1,3-bishydroxyethylbenzene, 1,4-bishydroxyethylbenzene, trimethylolpropane, glycerol, pentaerythritol, erythritol, sorbitol, ethylenediamine, monoethanolamine, diethanolamine, triethanolamine or meta-xylylenediamine and their alkylene oxide addition products, various types of polyester resins, polyether polyols and polyamide macromolecular active hydrogen compounds.

The glass transition temperature of the cured coating film of resin (A) and isocyanate compound (B) is preferably in the range of −30° C. to 80° C. The range is more preferably 0° C. to 70° C. The range is yet more preferably 25° C. to 70° C. If the glass transition temperature is higher than 80° C., the flexibility of the cured coating film near room temperature will be reduced, potentially lowering the adhesive force due to impaired adhesiveness with the substrate. If it is lower than −30° C., on the other hand, the molecular motion of the cured coating film near ordinary temperature will become intense, potentially preventing the oxygen barrier properties from being exhibited, or potentially lowering the adhesive force due to insufficient cohesion.

(Phosphoric Acid-Modified Compound (C))

The specific phosphoric acid-modified compound (C) has an effect of increasing the lamination strength for the inorganic substrate of the invention, and any commonly known one may be used.

More specifically, it includes phosphoric acid, pyrophosphoric acid, triphosphoric acid, methyl acid phosphate, ethyl acid phosphate, butyl acid phosphate, dibutyl phosphate, 2-ethylhexyl acid phosphate, bis(2-ethylhexyl)phosphate, isododecyl acid phosphate, butoxyethyl acid phosphate, oleyl acid phosphate, tetracosyl acid phosphate, 2-hydroxyethyl methacrylate acid phosphate and polyoxyethylene alkyl ether phosphoric acid.

(Lamellar Inorganic Compound (D))

The resin composition for an adhesive contains a lamellar inorganic compound.

The lamellar inorganic compound to be used has an effect of improving the lamination strength and oxygen barrier properties of the adhesive obtained by curing the resin composition for an adhesive.

Examples of such lamellar inorganic compounds include kaolinite-serpentine clay minerals (halloysite, kaolinite, endelite, dickite, nacrite, antigorite, chrysotile and the like) and pyrophyllite-talc minerals (pyrophyllite, talc, keroli etc.) and the like.

As specific examples of adhesive layers with oxygen barrier properties, using a resin composition for an adhesive containing (A) a resin having two or more hydroxyl groups in the molecule as functional groups, (B) an isocyanate compound having two or more isocyanate groups in the molecule as functional groups and (C) a specific phosphoric acid-modified compound, there may be used the PASLIM Series adhesives with oxygen barrier properties marketed by DIC Corp., and preferably PASLIM VM001/VM102CP, wherein the main backbone is polyester-based and the curing agent is a compound having two or more isocyanate groups.

[Barrier Layer]

In the laminate of the invention, the barrier layer to be provided between the sealant layer (heat-sealable layer) and adhesive layer may be a barrier film having gas barrier properties that prevent permeation of oxygen gas and water vapor, which is a vapor deposition film comprising an inorganic material or inorganic oxide.

Vapor deposition films comprising inorganic materials or inorganic oxides include, specifically, barrier films composed of aluminum vapor deposition films, alumina vapor deposition films and silica vapor deposition films, and especially aluminum vapor deposition films.

When a vapor deposition film is be formed, the barrier layer can be provided directly on the sealant layer, instead of through an adhesive layer of an adhesive or the like.

If necessary, a light-shielding property may be imparted to inhibit transmission of visible light and ultraviolet rays. Also, two or more barrier layers may be provided. When two or more barrier layers are provided, each of them may have the same composition, or they may have different compositions.

The thickness of the vapor deposition film will usually be a thickness selected as desired in the range of, for example, about 10 to 2000 angstrom and preferably about 10 to 1000 angstrom. More specifically, for an aluminum vapor deposition film, the film thickness is preferably 10 to 600 angstrom and more preferably 10 to 400 angstrom. For a silicon oxide or aluminum oxide vapor deposition film, the film thickness is preferably 10 to 500 angstrom and more preferably 10 to 300 angstrom.

The vapor deposition film can be formed by a method known in the prior art using an inorganic material or inorganic oxide known in the prior art, and its composition and forming method are not particularly restricted. The method of forming the vapor deposition film may be, for example, a physical vapor deposition method (PVD) such as vacuum vapor deposition, sputtering or ion plating, or a chemical vapor deposition method (CVD) such as plasma chemical vapor deposition, thermochemical vapor deposition or photochemical vapor deposition.

According to the invention, the vapor deposition film that is to serve as the barrier layer is formed on the adhesive layer side surface of the sealant layer.

During the formation, the sealant layer surface may, if necessary, be subjected to physical treatment such as corona discharge treatment, ozone treatment, cold plasma treatment using oxygen gas or nitrogen gas, or glow discharge treatment, or to chemical treatment such as oxidizing treatment using a chemical agent.

[Sealant Layer (Heat-Sealable Layer)]

The sealant layer composing the laminate of the invention may be one that provides heat sealability to the laminate of the invention, and to the packaging material composed of the laminate. It may also impart functions such as flex resistance and impact resistance to the laminate of the invention. It is most preferably one that imparts flex resistance, to inhibit reduction in the gas barrier property after bending.

According to the invention, therefore, any material that supplements the conditions described above may be used.

According to the invention, a heat-sealing resin layer is preferred as the sealant layer. The heat-sealing resin layer may be one that can melt by heat to become mutually compatible.

Specifically, there may be used a film or sheet or other coated film of one or more resins composed of low-density polyethylene, medium-density polyethylene, high-density polyethylene, linear low-density polyethylene, polypropylene, ethylene-vinyl acetate copolymer, an ionomer resin, ethylene-ethyl (meth)acrylate copolymer, ethylene-acrylic acid copolymer, ethylene-(meth)acrylic acid copolymer, ethylene-propylene copolymer, methylpentene polymer, a polyolefin-based resin obtained by modifying a polyolefin-based resin such as polyethylene or polypropylene with an unsaturated carboxylic acid such as acrylic acid, methacrylic acid, maleic anhydride or fumaric acid, an ethylene-(meth)acrylic acid ester-unsaturated carboxylic acid terpolymer resin, a cyclic polyolefin resin or cyclic olefin copolymer, polyethylene terephthalate (PET), polyacrylonitrile (PAN), or another resin.

The resin layer may, if necessary, contain publicly known flex resistance modifiers or inorganic or organic additives.

The film or sheet used to form the resin layer may be an unstretched film or sheet, or a stretched film or sheet obtained by stretching in a uniaxial direction or biaxial directions.

A stretched film that has been stretched in biaxial directions may be longitudinally stretched to a factor of 2 to 4 using a roll stretcher at 50° C. to 100° C., for example, transversely stretched to a factor of 3 to 5 using a tenter stretcher in an atmosphere of 90° C. to 150° C., and then subjected to heat treatment in an atmosphere at 100° C. to 240° C. with the same tenter. The stretched film may also be subjected to simultaneous biaxial stretching or sequential biaxial stretching.

(Film Thickness of Sealant Layer)

The thickness of the sealant layer composed of the resin film or sheet may be selected as desired, but from the viewpoint of strength as a packaging material, it may be selected in a range of about 5 to 500 μm, and preferably in a range of 10 to 250 μm. If it has a smaller thickness, the lamination strength obtained will not be sufficient even with heat sealing, and the pierce resistance will be reduced to the point of failing to function as a packaging material. A larger thickness will tend to increase cost, while also resulting in a harder film and poorer manageability.

[Vapor Deposition Layer]

In the laminate of the packaging material of the invention, a vapor deposition layer may be provided on the side of the substrate layer that is to contact with the adhesive layer, to increase the gas barrier properties against oxygen gas and water vapor. The vapor deposition layer may be a vapor deposition film composed of an inorganic material or inorganic oxide, similar to the barrier layer, but it is preferably an aluminum vapor deposition film, as a metal vapor deposition film, or an alumina vapor deposition film or silica vapor deposition film, as a metal oxide vapor deposition film. The method of forming the vapor deposition film may also be by the same publicly known method as the method of forming the barrier layer.

According to the invention, when a vapor deposition layer is to be formed on the substrate layer surface, the substrate layer surface is preferably subjected to physical treatment such as corona discharge treatment, ozone treatment, cold plasma treatment using oxygen gas or nitrogen gas or glow discharge treatment, or chemical treatment such as oxidizing treatment using a chemical agent or the like, in order to increase the adhesiveness with the vapor deposition layer.

[Barrier Coat Layer]

According to the invention, a barrier coat layer may further be provided on the vapor deposition layer that has been formed on the substrate layer, in order to increase the gas barrier properties against oxygen gas and water vapor.

According to the invention, the coated film with barrier properties that is to form the barrier coat layer is a film comprising a gas barrier composition such as an alkoxide hydrolysate or alkoxide hydrolytic condensate obtained by polycondensation of an alkoxide and a water-soluble polymer, by a sol-gel method, in the presence of a sol-gel catalyst, an acid, water and an organic solvent. The composition with barrier properties may further contain a silane coupling agent, depending on the case.

The alkoxide that may be used for the composition with barrier properties is preferably at least one type of alkoxide represented by the general formula $R^1{}_nM(OR^2)_m$ (where $R^1$ and $R^2$ each represent a C1-8 organic group, M represents a metal atom, n represents an integer of 0 or greater, m represents an integer of 1 or greater, and n+m represents the valency of M). The metal atom M may be silicon, zirconium, titanium, aluminum or another metal. Specific examples for the organic groups represented by $R^1$ and $R^2$ include alkyl groups such as methyl, ethyl, n-propyl, i-propyl, n-butyl and i-butyl. These alkyl groups may be the same or different in the same molecule. Examples of such alkoxides include tetramethoxysilane $Si(OCH_3)_4$, tetraethoxysilane $Si(OC_2H_5)_4$, tetrapropoxysilane $Si(OC_3H_7)_4$ and tetrabutoxysilane $Si(OC_4H_9)_4$.

Also, water-soluble polymers that may be used in the composition with barrier properties are preferably polyvinyl alcohol-based resins or ethylene-vinyl alcohol copolymers, or both. The resins that are used may be commercially available ones, and for example, ethylene-vinyl alcohol copolymers include EVAR EP-F101 (ethylene content: 32 mol %) by Kuraray Co., Ltd., and SOARNOL D2908 (ethylene content: 29 mol %) by Nippon Synthetic Chemical Industry Co., Ltd. Polyvinyl alcohol-based resins that may be used include RS polymers by Kuraray Co., Ltd., such as RS-110 (saponification degree=99%, polymerization degree=1,000), KURARAY POVAL LM-20SO (saponification degree=40%, polymerization degree=2,000) by the same company, and GOHSENOL NM-14 (saponification degree=99%, polymerization degree=1,400) by Nippon Synthetic Chemical Industry Co., Ltd.

The sol-gel catalyst may be a tertiary amine that is essentially insoluble in water and soluble in organic solvents. Specific compounds that may be used include N,N-dimethylbenzylamine, tripropylamine, tributylamine and tripentylamine. Most particularly preferred is N,N-dimethylbenzylamine, which is preferably used at 0.01 to 1.0 part by mass and especially about 0.03 part by mass, to 100 parts by mass as the total of the alkoxysilane and silane coupling agent.

Examples for acids to be used in the composition with barrier properties include mineral acids such as sulfuric acid, hydrochloric acid and nitric acid, and organic acids such as acetic acid and tartaric acid, as well as other acids. The amount of acid used is preferably 0.001 to 0.05 mol and more preferably 0.01 to 0.03 mol with respect to the total molar amount of the alkoxide and the alkoxysilane portion (for example, silicate portion) of the silane coupling agent.

Methyl alcohol, ethyl alcohol, n-propyl alcohol, isopropyl alcohol, n-butanol and the like may be used as organic solvents.

Organoalkoxysilanes containing known organic reactive groups may be used as the silane coupling agent, but organoalkoxysilanes with epoxy groups are especially preferred, and for example, γ-glycidoxypropyltrimethoxysilane, γ-glycidoxypropylmethyldiethoxysilane or β-(3,4-epoxycyclohexyl) ethyltrimethoxysilane may be used. Such silane coupling agents may be used alone or in mixtures of two or more. According to the invention, the amount of silane coupling agent used may be in the range of about 1 to 20 parts by mass with respect to 100 parts by mass of the alkoxide.

The content of the water-soluble polymer in the composition with barrier properties is preferably in the range of 5 to 500 parts by weight with respect to 100 parts by weight as the total alkoxide. If the content exceeds 500 parts by weight, the brittleness of the formed barrier coat layer will increase and the weather resistance and other properties will be reduced, which is undesirable.

The barrier coat layer is formed by coating once or several times using a coating solution for formation of the barrier coat layer, by conventional publicly known means such as common roll coating, using a gravure roll coater or the like, spray coating, spin coating, dipping, brushing, barcode or an applicator.

The following is a specific example of a method for forming the barrier coat layer.

First, a gas barrier coating solution is prepared by mixing an alkoxide, a polyvinyl alcohol-based resin and/or ethylene-vinyl alcohol copolymer, a sol-gel catalyst, water, an organic solvent and if necessary a silane coupling agent. The polycondensation reaction gradually proceeds in the gas barrier coating solution.

Next, the gas barrier coating solution is coated and dried onto the vapor deposition layer (film) by a common method. Drying further promotes polycondensation of the alkoxide and vinyl alcohol polymer (and silane coupling agent), forming a composite polymer layer. Preferably, the aforementioned procedure is repeated to allow layering of multiple composite polymer layers.

Finally, the laminate coated with the coating solution is heated for 1 second to 10 minutes at a temperature of 20 to 250° C. and preferably 50 to 220° C. This allows formation of a barrier coat layer on the vapor deposition layer.

The barrier coat layer may be a composite polymer layer obtained by overlaying one or more layers. The thickness of the dried barrier coat layer is in the range of 0.01 to 100 μm and preferably 0.01 to 50 μm. A dried thickness of less than 100 μm can help prevent generation of cracks.

[Printing Layer]

The packaging material comprising the laminate of the invention may, if necessary, have an optionally formed printing layer of characters, graphics, symbols or any other desired pattern, formed using a common printing system, between the barrier coat layer and adhesive layer, as shown in FIG. 3, for example.

The laminate of the invention and a packaging material comprising the laminate may be produced by laminating, via the aforementioned adhesive layer, the substrate layer surface and a barrier layer surface having a barrier layer formed on one side of a sealant layer, or a barrier coat layer surface of a substrate layer on which a vapor deposition layer and a barrier coat layer are formed on one side of a substrate layer, and a barrier layer surface having a barrier layer formed on one side of a sealant layer, or if necessary, the printing surface of a substrate layer on which a printing layer is formed, and a barrier layer surface having a barrier layer formed on one side of a sealant layer.

The present invention will now be explained in greater detail using examples.

EXAMPLES

Example 1

Transparent Vapor Deposited PET12/Oxygen Barrier Adhesive/VM-CPP25

Using a 12 μm-thick polyethylene terephthalate (PET) film as the substrate layer, and mounting it on the delivery roll of a plasma chemical vapor deposition apparatus, a silicon oxide vapor deposition film with a thickness of 200 angstroms was then formed on the corona treated surface of the polyester-based resin, under the following conditions.

<Vapor Deposition Conditions>

Vapor deposition surface: Corona treated surface

Injected gas: Hexamethyldisiloxane:oxygen gas:helium=1.0:3.0:3.0 (units: slm)

Degree of vacuum in vacuum chamber: $2-6 \times 10^{-6}$ mBar

Degree of vacuum in vapor deposition chamber: $2-5 \times 10^{-3}$ mBar

Cooling/electrode drum power supply: 10 kW

Line speed: 100 m/min

Next, immediately after forming the silicon oxide vapor deposition film with a film thickness of 200 angstroms (20 nm), the silicon oxide vapor deposition film side was subjected to oxygen/argon mixed gas plasma treatment using a glow discharge plasma generation apparatus at a power of 9 kw, with a mixed gas comprising oxygen gas:argon gas=7.0:2.5 (units: slm), and a mixed gas pressure of $6 \times 10$ Torr, to form a plasma treated surface with the silicon oxide vapor deposition film surface tension increased to at least 54 dyne/cm.

The sealant layer used was a 25 μm-thick unstretched polypropylene (CPP) film (2703 by Toray Advanced Film Co., Ltd.), and after subjecting one side of the CPP film to corona treatment, the corona treated surface was aluminum vapor deposited (40 nm film thickness) to form a barrier layer, thus fabricating an aluminum vapor deposited CPP film (sealant layer comprising a barrier layer).

Next, the barrier coat layer surface of the transparent vapor deposited PET film comprising the barrier coat layer and the barrier layer surface of the aluminum vapor deposited CPP film comprising the barrier layer were dry laminated via an adhesive having oxygen barrier properties (PASLIM VM001/VM102CP, product of DIC Corp.). The coating amount of the adhesive was an amount so that the thickness of the adhesive layer was 3 g/m² as a dry film. After lamination, aging treatment was carried out for 3 days at 40° C. to obtain a laminate for Example 1.

Example 2

Transparent Vapor Deposited PET12/Oxygen Barrier Adhesive/VM-PEF25

Using a 12 μm-thick polyethylene terephthalate (PET) film as the substrate layer, one side of the PET film was subjected to corona treatment, and then the corona treated surface was silica vapor deposited (40 nm film thickness) to form a barrier coat layer, thus fabricating a silica vapor deposited transparent PET film (substrate layer comprising a barrier coat layer).

The sealant layer used was a 25 μm-thick polyethylene (PE) film (ML-TUX-F, product of Mitsui Chemicals Tohcello Co., Ltd.), and after subjecting one side of the PE film to corona treatment, the corona treated surface was aluminum vapor deposited (40 nm film thickness) to form a barrier layer, thus fabricating an aluminum vapor deposited PE film (sealant layer comprising a barrier layer).

Next, the barrier coat layer surface of the transparent vapor deposited PET film comprising the barrier coat layer and the barrier layer surface of the aluminum vapor deposited PE film comprising the barrier layer were dry laminated via an adhesive having oxygen barrier properties (PASLIM VM001/VM102CP, product of DIC Corp.). The coating amount of the adhesive was an amount so that the thickness of the adhesive layer was 3 g/m² as a dry film. After lamination, aging treatment was carried out for 3 days at 40° C. to obtain a laminate for Example 2.

Example 3

Transparent PET12/Oxygen Barrier Adhesive/VM-CPP25

A laminate for Example 3 was obtained in the same manner as Example 1, except that biaxial stretched PET (T-4102 by Toyobo, Ltd.) was used as the substrate layer of Example 1, or in other words, a substrate layer without a vapor deposition layer and barrier coat layer was used.

Example 4

Transparent Vapor Deposited PET12/Printing Layer/Oxygen Barrier Adhesive/VM-CPP25

A laminate for Example 4 was obtained in the same manner as Example 1, except that a printing layer composed of a urethane-based ink was further provided on the barrier coat layer in Example 1.

Comparative Example 1

Transparent Vapor Deposited PET12/Adhesive/VM-CPP25

Using a 12 μm-thick polyethylene terephthalate (PET) film as the substrate layer, one side of the PET film was subjected to corona treatment, and then the corona treated surface was silica vapor deposited (40 nm film thickness) to form a barrier coat layer, thus fabricating a silica vapor deposited transparent PET film (substrate layer comprising a barrier coat layer).

The sealant layer used was a 25 μm-thick unstretched polypropylene (CPP) film (2703 by Toray Advanced Film Co., Ltd.), and one side of the CPP film was subjected to corona treatment, to fabricate a single-side corona treated CPP film.

Next, the barrier coat layer surface of the transparent vapor deposited PET film comprising the barrier coat layer and the corona treated surface of the single-side corona treated CPP film were dry laminated via a two-pack curable urethane adhesive (RU-40/H-4, product of Rock Paint Co.). The coating amount of the adhesive was an amount so that the thickness of the adhesive layer was 3 g/m² as a dry film. After lamination, aging treatment was carried out for 3 days at 40° C. to obtain a laminate for Comparative Example 1.

Comparative Example 2

Transparent Vapor Deposited PET12/Adhesive/VM-PEF25

Using a 12 µm-thick polyethylene terephthalate (PET) film as the substrate layer, one side of the PET film was subjected to corona treatment, and then the corona treated surface was silica vapor deposited (40 nm film thickness) to form a barrier coat layer, thus fabricating a silica vapor deposited transparent PET film (substrate layer comprising a barrier coat layer).

The sealant layer used was a 25 µm-thick polyethylene (PE) film (ML-TUX-F, product of Mitsui Chemicals Tohcello Co., Ltd.), and one side of the PE film was subjected to corona treatment, to fabricate a single-side corona treated PE film.

Next, the barrier coat layer surface of the transparent vapor deposited PET film comprising the barrier coat layer and the corona treated surface of the single-side corona treated PE film were dry laminated via a two-pack curable urethane adhesive (RU-40/H-4, product of Rock Paint Co.). The coating amount of the adhesive was an amount so that the thickness of the adhesive layer was 3 g/m² as a dry film. After lamination, aging treatment was carried out for 3 days at 40° C. to obtain a laminate for Comparative Example 2.

Comparative Example 3

Transparent Vapor Deposited PET12/Adhesive Containing Ultrafine Particulate Silicon Oxide, Aluminum Oxide/VM-PEF25

A laminate for Comparative Example 3 was obtained in the same manner as Example 1, except that the adhesive with oxygen barrier properties of Example 1 (PASLIM VM001/VM102CP, product of DIC Corp.) was changed to a urethane-based barrier adhesive obtained by adding a mixture of silicon oxide and aluminum oxide particles converted to ultrafine particles of 10 nm and 15 nm respectively with a wet crusher, to 90 parts by weight of an acetic acid solution of a polyester polyol with a number-average molecular weight of 25,000 (solid content: 40%) obtained by polycondensation of terephthalic acid and ethylene glycol and 1,6-hexanediol, at 10 wt % with respect to the polyester polyol resin, and then mixing in 10 parts by weight of an acetic acid solution of a urethane adduct (solid content: 75%) obtained by reacting 1 mol of trimethylolpropane and 3 mol of tolylene diisocyanate, and further adding 117 parts by weight of ethyl acetate.

Comparative Example 4

Transparent Vapor Deposited PET12/Oxygen Barrier Adhesive/PE/VM-CPP25

A laminate for Comparative Example 4 was obtained in the same manner as Example 1, except that in Example 1, the barrier coat layer surface of the transparent vapor deposited PET film comprising the barrier coat layer was coated with an adhesive having oxygen barrier properties (PASLIM VM001/VM102CP by DIC Corp.) to a dried thickness of 3 µm, polyethylene was melt extruded onto this coating surface to a thickness of 15 µm, and the melt extruded surface of the polyethylene and the barrier layer surface of the aluminum vapor deposited CPP film comprising a barrier layer were laminated.

[Lamination Strength]

The laminates obtained in Examples 1 to 4 and Comparative Examples 1 to 4 were cut as test strips with 15 mm widths, and a TENSILON tensile tester (RTC-1310A by Orientech Co., Ltd.) was used to measure the maximum load when detachment occurred between the substrate layer and sealant layer with a T-peeling system (pull rate: 50 mm/min) in an atmosphere at 25° C., the value being recorded as the lamination strength (N/15 mm). The results are shown in Table 1 below.

TABLE 1

|  | Strength (N/15 mm) |
| --- | --- |
| Example 1 | 1.24 |
| Example 2 | 1.37 |
| Example 3 | 1.22 |
| Example 4 | 1.35 |
| Comp. Example 1 | 0.96 |
| Comp. Example 2 | 1.17 |
| Comp. Example 3 | 1.30 |
| Comp. Example 4 | 1.21 |

The oxygen barrier properties and water vapor barrier properties of the laminates obtained in Examples 1 to 4 and Comparative Examples 1 to 4 were then measured. For measurement of the oxygen barrier properties, an OXTRAN2/20 by Mocon, U.S. was used to measure the oxygen permeability (cc/m²·day·atm) under conditions of 23° C., 90% RH, and for measurement of the water vapor barrier properties, a PERMATRAN3/31 by Mocon, U.S. was used to measure the water vapor permeability (g/m²·day·atm) under conditions of 40° C., 90% RH. The results are shown in Table 2.

TABLE 2

|  | Oxygen permeability (23° C., 90% RH) cc/m² · day · atm | Water vapor permeability (40° C., 90% RH) g/m² · day · atm |
| --- | --- | --- |
| Example 1 | 0.25 | 0.05 |
| Example 2 | 0.22 | 0.07 |
| Example 3 | 0.58 | 0.05 |
| Example 4 | 0.45 | 0.06 |
| Comp. Example 1 | 1.18 | 0.06 |
| Comp. Example 2 | 1.32 | 0.07 |
| Comp. Example 3 | 0.24 | 0.06 |
| Comp. Example 4 | 0.50 | 0.06 |

In addition, the laminates obtained in Examples 1 to 4 and Comparative Examples 1 to 4 were each cut to A4 size and subjected to a flexural load 3 times with a Gelbo Flex Tester, after which the oxygen barrier properties (oxygen permeability (cc/m²·day·atm) under conditions of 23° C., 90% RH) and water vapor barrier properties (water vapor permeability (g/m²·day·atm) under conditions of 40° C., 90% RH) of each laminate were measured as described above. The results are shown in Table 3.

TABLE 3

| | Gelbo tests | Oxygen permeability (23° C., 90% RH) cc/m² · day · atm | Water vapor permeability (40° C., 90% RH) g/m² · day · atm |
| --- | --- | --- | --- |
| Example 1 | 3 | 1.49 | 0.42 |
| Example 2 | 3 | 1.55 | 0.45 |
| Example 3 | 3 | 2.37 | 0.42 |
| Example 4 | 3 | 1.87 | 0.46 |
| Comp. Example 1 | 3 | 6.02 | 0.43 |
| Comp. Example 2 | 3 | 6.41 | 0.53 |
| Comp. Example 3 | 3 | 2.50 | 0.46 |
| Comp. Example 4 | 3 | 2.43 | 0.48 |

When using an adhesive having oxygen barrier properties, the lamination strength was confirmed to be equivalent to using a common two-pack curable urethane adhesive. It was also confirmed that with a laminate film construction using a vapor deposition film as the barrier layer, excellent barrier performance was exhibited in terms of the oxygen barrier properties, and especially the oxygen barrier properties with the laminate film subjected to a flexural load.

The invention claimed is:

1. A packaging material comprising a laminate having at least a substrate layer, an adhesive layer, a barrier layer, and a sealant layer,
wherein the adhesive layer has oxygen barrier properties,
the adhesive layer includes at least one resin selected from the group consisting of (A) a resin having two or more hydroxyl groups in the molecule as functional groups, (B) a resin having an isocyanate compound having two or more isocyanate groups in the molecule as functional groups, and (C) a resin having a specific phosphoric acid-modified compound,
a main backbone of the at least one resin is selected from the group consisting of polyester, polyester-polyurethane, polyether, and polyether-polyurethane, and
the barrier layer is present between the sealant layer and the adhesive layer and comprises an inorganic material.

2. The packaging material according to claim 1, wherein the barrier layer is an aluminum vapor deposition film.

3. The packaging material according to claim 1, wherein the thickness of the barrier layer is 1 to 100 nm.

4. The packaging material according to claim 1, wherein the coating amount of the adhesive of the adhesive layer is 2.0 μm to 4.0 μm.

5. The packaging material according to claim 1, wherein an oxygen permeability of the laminate in an environment of 23° C., 90% RH is 0.05 to 1.00 cc/m²·day·atm.

6. The packaging material according to claim 1, wherein after the laminate has been subjected to a flexural load 3 times with a Gelbo Flex Tester, an increase in an oxygen permeability of the laminate in an environment of 23° C., 90% RH compared to before being subjected to the flexural load is 0.7 to 4.0 cc/m²·day·atm.

7. The packaging material according to claim 1, wherein the inorganic material is an inorganic oxide.

8. The packaging material according to claim 1, further comprising a vapor deposition layer and a barrier coat layer, wherein the vapor deposition layer and the barrier coat layer are disposed between the substrate layer and the adhesive layer.

9. The packaging material according to claim 8, further comprising a printing layer, wherein the printing layer is disposed between the barrier coat layer and the adhesive layer.

10. The packaging material according to claim 8, wherein the vapor deposition layer is composed of an aluminum vapor deposition film, an alumina vapor deposition film, or a silica vapor deposition film.

11. The packaging material according to claim 1, wherein the adhesive layer, the barrier layer, and the sealant layer are disposed on one side of the substrate layer, the adhesive layer being the closest to the substrate layer.

12. The packaging material according to claim 11, wherein a surface of the barrier layer has recesses of irregularities, and the recesses are filled by the at least one resin in the adhesive layer.

13. The packaging material according to claim 11, further comprising a vapor deposition layer and a barrier coat layer, wherein the vapor deposition layer and the barrier coat layer are disposed between the substrate layer and the adhesive layer.

14. The packaging material according to claim 13, wherein the barrier coat layer is disposed adjacent to the adhesive layer.

15. The packaging material according to claim 14, further comprising a printing layer, wherein the printing layer is disposed between the barrier coat layer and the adhesive layer.

16. The packaging material according to claim 13, further comprising a printing layer, wherein the printing layer is disposed between the barrier coat layer and the adhesive layer.

* * * * *